United States Patent
Hiratsuka et al.

(10) Patent No.: US 9,606,389 B2
(45) Date of Patent: Mar. 28, 2017

(54) LIQUID CRYSTAL DISPLAY DEVICE AND METHOD FOR MANUFACTURING THE SAME

(71) Applicant: Japan Display Inc., Tokyo (JP)

(72) Inventors: Takato Hiratsuka, Chiba (JP); Osamu Itou, Hitachi (JP); Masanao Yamamoto, Mobara (JP); Daisuke Sonoda, Chiba (JP); Toshimasa Ishigaki, Chiba (JP)

(73) Assignee: Japan Display Inc., Tokyo (JP)

( * ) Notice: Subject to any disclaimer, the term of this patent is extended or adjusted under 35 U.S.C. 154(b) by 846 days.

(21) Appl. No.: 13/833,941

(22) Filed: Mar. 15, 2013

(65) Prior Publication Data
US 2013/0250199 A1 Sep. 26, 2013

(30) Foreign Application Priority Data
Mar. 23, 2012 (JP) .................................. 2012-066655

(51) Int. Cl.
G02F 1/1333 (2006.01)
G02F 1/1343 (2006.01)

(52) U.S. Cl.
CPC .. *G02F 1/133345* (2013.01); *G02F 1/133377* (2013.01); *G02F 1/134336* (2013.01)

(58) Field of Classification Search
None
See application file for complete search history.

(56) References Cited

U.S. PATENT DOCUMENTS

| 5,668,651 | A | * | 9/1997 | Yamada | G02F 1/1395 349/117 |
| 5,694,188 | A | * | 12/1997 | Sano | G02F 1/134363 349/139 |
| 6,704,082 | B2 | * | 3/2004 | Tomioka | G02F 1/133723 349/123 |
| 2013/0148048 | A1 | * | 6/2013 | Hiratsuka | G02F 1/1343 349/38 |
| 2013/0182211 | A1 | * | 7/2013 | Hiratsuka | G02F 1/133377 349/143 |

FOREIGN PATENT DOCUMENTS

JP 6-214244 8/1994

* cited by examiner

*Primary Examiner* — Edward Glick
*Assistant Examiner* — Anthony G Quash
(74) *Attorney, Agent, or Firm* — Typha IP LLC (57) ABSTRACT

The present invention provides a liquid crystal display device including: plural pixels disposed in a matrix shape, each pixel having insulating wall-shaped structures at the boundaries of the pixels and a small wall-shaped structure between the wall-shaped structures; wall electrodes, each having wall-shaped electrodes formed on the side faces of the wall-shaped structures, and planar electrodes that are connected to the wall-shaped electrodes and extend in the planar direction; electrodes, each having a TFT-side electrode covering the small wall-shaped structure and a storage capacitor electrode that is connected to the TFT-side electrode and extends in the planar direction of the substrate; and interlayer insulating films formed between the storage capacitor electrodes and the planar electrodes. And the interlayer insulating films of inorganic films are not formed on the upper and side faces and at the base portions of the wall-shaped structures at the boundaries of the pixels.

12 Claims, 6 Drawing Sheets

LIQUID CRYSTAL DISPLAY DEVICE AND METHOD FOR MANUFACTURING THE SAME

CLAIM OF PRIORITY

The present application claims priority from Japanese patent application JP2012-066655 filed on Mar. 23, 2012, the content of which is hereby incorporated by reference into this application.

BACKGROUND OF THE INVENTION

1. Field of the Invention

The present invention relates to a wall electrode-type liquid crystal display device, and particularly to a liquid crystal display device in which the display performance and reliability are improved.

2. Description of the Related Art

Liquid crystal display devices have been used in a wide range from small-sized mobile terminals to large-sized televisions due to the characteristics such as the high quality of display, a small thickness and a light weight, and low power consumption.

On the other hand, viewing angle characteristics are important in liquid crystal display devices, and IPS (In-plane Switching)-type liquid crystal display devices have been proposed to realize a wide viewing angle. In the IPS type, while liquid crystal molecules are horizontally directed, electric field in parallel with the substrate is applied to rotate the liquid crystal molecules in a horizontal plane, so that the amount of backlight can be controlled to display an image.

Japanese Patent Application Laid-Open Publication No. H6-214244 discloses a liquid crystal display device having a predetermined structure in which m×n pieces of pixels in a matrix shape, active elements in the pixels, driving means to apply a predetermined voltage waveform, and a pair of electrodes that keeps constant a gap between upper and lower substrates in the pixel are provided, and the alignment state of liquid crystal molecules can be controlled to modulate light by applying electric field in parallel with the surface of the substrate to between the pair of electrodes (see Abstract).

SUMMARY OF THE INVENTION

In order to realize such a liquid crystal display device in which the pair of electrodes are provided between the upper and lower substrates and the alignment state of liquid crystal molecules are controlled by applying electric field in parallel with the surface of the substrate to between the pair of electrodes, the following liquid crystal display device was studied prior to the present invention. Namely, insulating wall-shaped structures are provided at the boundaries of pixels and a small wall-shaped structure is provided between the wall-shaped structures, the side faces of the wall-shaped structures at the boundaries of the pixels are covered with wall-shaped electrodes, and the surfaces of the small wall-shaped structures are covered with electrodes.

However, in the case where the wall-shaped structures disposed at the boundaries of the pixels are used as spacers (SOC: Spacers on Color Filter) in combination, if interlayer insulating films formed using SiN and $SiO_2$ inorganic films that are dense and hard are formed on the upper layers of the wall-shaped structures, the interlayer insulating films are cracked at the time of being attached to a CF (Color Filter)-side substrate to form gaps. Thus, bright spots are generated and gap variations occur due to foreign substances in a liquid crystal layer, leading to display failure and deterioration in reliability.

Further, in a process in which electrodes are formed on the upper layers of the wall-shaped structures through inorganic insulating films, the thicknesses of the inorganic insulating films become large at the tops of the side faces of the wall-shaped structures and become small at the base portions thereof. Thus, the electrodes provided on the upper layers of the inorganic insulating films are likely to be disconnected at the base portions of the side faces of the wall-shaped structures, resulting in display failure and deterioration in reliability.

An object of the present invention is to provide a wall electrode-type liquid crystal display device in which disconnection of wall electrodes that occurs around the base portions of wall-shaped structures is suppressed, crack of interlayer insulating films due to a pressure at the time of forming gaps is suppressed, and the yield ratio is improved.

In order to address the problems, for example, configurations described in claims will be employed.

In an example of a liquid crystal display device according to the present invention, provided is a liquid crystal display device including: plural pixels disposed in a matrix shape, each pixel having insulating wall-shaped structures at the boundaries of the pixels and a small wall-shaped structure smaller than the wall-shaped structures between the wall-shaped structures; wall electrodes, each having wall-shaped electrodes formed on the side faces of the wall-shaped structures at the boundaries of the pixels, and planar electrodes that are connected to the wall-shaped electrodes and extend in the planar direction from faces where the wall-shaped electrodes are in contact with a substrate; electrodes, each having a TFT-side electrode covering the small wall-shaped structure and a storage capacitor electrode that is connected to the TFT-side electrode and extends in the planar direction of the substrate; and interlayer insulating films formed between the storage capacitor electrodes and the planar electrodes, wherein the thicknesses of the wall electrodes at connection parts between the wall-shaped electrodes and the planar electrodes are formed to be large at the base portions of the wall-shaped structures at the boundaries of the pixels.

Further, in another example of a liquid crystal display device according to the present invention, provided is a liquid crystal display device including: plural pixels disposed in a matrix shape, each pixel having insulating wall-shaped structures at the boundaries of the pixels and a small wall-shaped structure smaller than the wall-shaped structures between the wall-shaped structures; wall electrodes, each having wall-shaped electrodes formed on the side faces of the wall-shaped structures at the boundaries of the pixels, and planar electrodes that are connected to the wall-shaped electrodes and extend in the planar direction from faces where the wall-shaped electrodes are in contact with a substrate; electrodes, each having a TFT-side electrode covering the small wall-shaped structure and a storage capacitor electrode that is connected to the TFT-side electrode and extends in the planar direction of the substrate; and interlayer insulating films formed between the storage capacitor electrodes and the planar electrodes, wherein the wall-shaped structures at the boundaries of the pixels formed using organic films are in contact with a color filter-side substrate through alignment films.

Further, the present invention provides a method of manufacturing a liquid crystal display device including: plural pixels disposed in a matrix shape, each pixel having insulating wall-shaped structures at the boundaries of the pixels and a small wall-shaped structure smaller than the wall-shaped structures between the wall-shaped structures; wall electrodes, each having wall-shaped electrodes formed on the side faces of the wall-shaped structures at the boundaries of the pixels, and planar electrodes that are connected to the wall-shaped electrodes and extend in the planar direction from faces where the wall-shaped electrodes are in contact with a substrate; electrodes, each having a TFT-side electrode covering the small wall-shaped structure and a storage capacitor electrode that is connected to the TFT-side electrode and extends in the planar direction of the substrate; and interlayer insulating films formed between the storage capacitor electrodes and the planar electrodes, the method including the steps of: forming the interlayer insulating films on the TFT-side electrodes and the storage capacitor electrodes on the whole surface of the TFT-side substrate; removing the interlayer insulating films provided on the upper and side faces and at the base portions of the wall-shaped structures at the boundaries of the pixels; and forming the wall electrodes on the planar electrodes from the side faces of the wall-shaped structures at the boundaries of the pixels.

According to the present invention, due to the large thicknesses of wall electrodes at connection parts between wall-shaped electrodes and planar electrodes, disconnection of the wall electrodes that occurs around the base portions of wall-shaped structures can be suppressed. Further, the wall-shaped structures at the boundaries of pixels formed using organic films are in contact with a color filter-side substrate through alignment films, so that crack of interlayer insulating films due to a pressure at the time of forming gaps can be suppressed. Accordingly, the yield ratio can be improved to decrease the cost.

Further, the wall-shaped structures are used as spacers in combination, so that the number of layers can be reduced, leading to a decrease in cost.

DETAILED DESCRIPTION OF THE INVENTION

Hereinafter, embodiments of the present invention will be described on the basis of the drawings. It should be noted that constitutional elements having the same functions are given the same reference numerals throughout the all drawings for explaining the embodiments, and the explanations thereof will not be repeated.

First Embodiment

Figure 6:
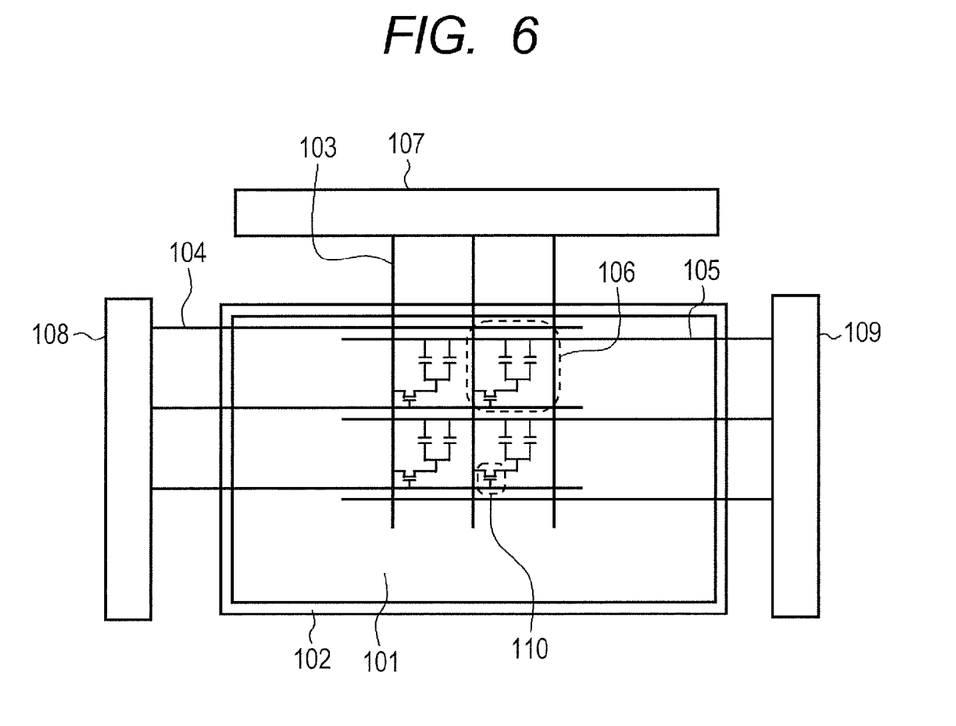
FIG. 6 is a diagram for showing an example of an equivalent circuit of the liquid crystal display device to which the present invention is applied.

In the first place, an example of an equivalent circuit of a liquid crystal display device to which the present invention is applied is shown in FIG. 6. Scanning lines 104 and signal lines 103 are wired on a substrate 102 in a matrix shape, and pixels 106 are connected to respective intersections between the scanning lines 104 and the signal lines 103 through TFT (Thin Film Transistor) elements 110. A scanning driving circuit 108 and a signal driving circuit 107 are connected to the scanning lines 104 and the signal lines 103, respectively, to apply voltage to the scanning lines 104 and the signal lines 103. Common lines 105 in parallel with the signal lines 103 are wired on the substrate 102, so that common voltage can be applied to the all pixels from a common voltage generating circuit 109. Liquid crystal compositions are sealed between the substrate 102 and a substrate 101 to configure a liquid crystal display device as a whole.

Figure 1:
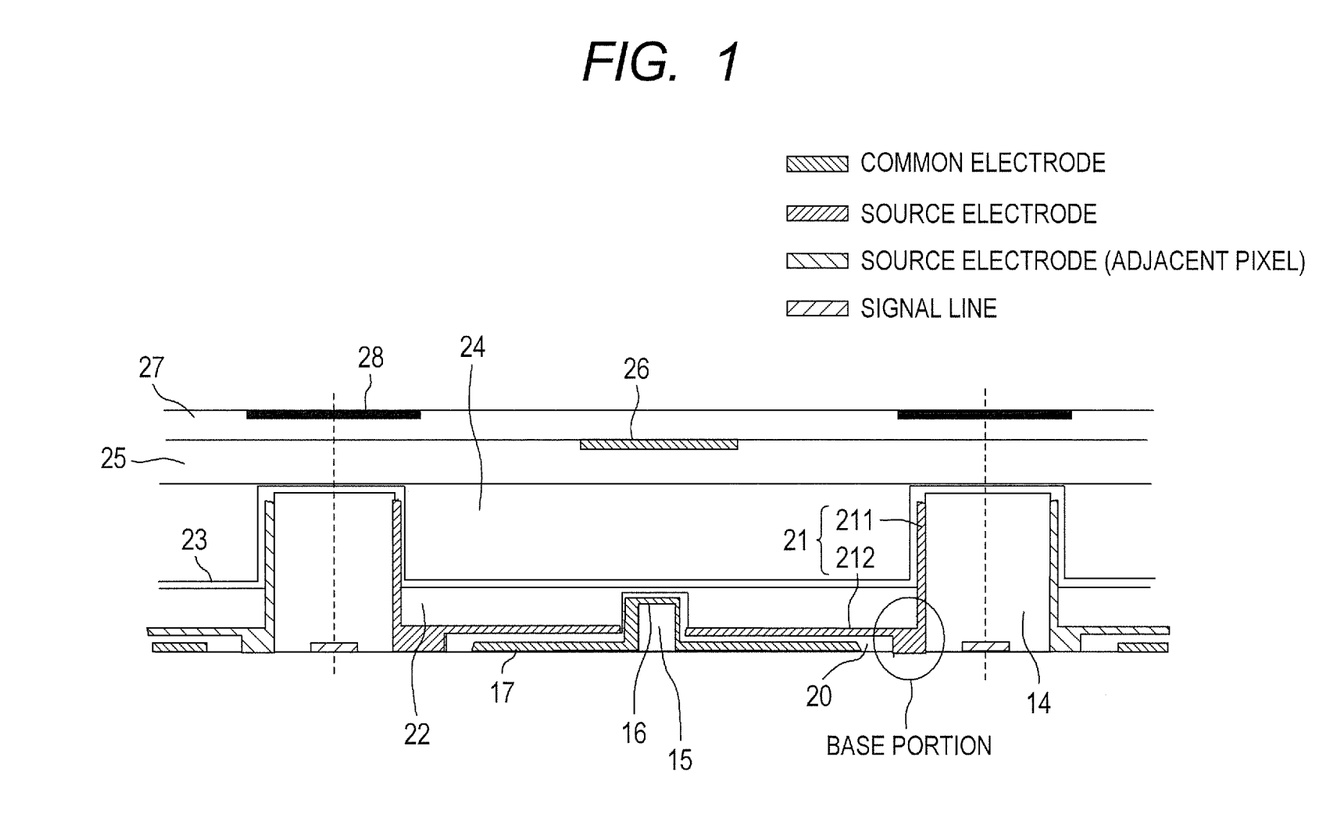
FIG. 1 is a diagram for showing a cross-sectional structure of a pixel of a liquid crystal display device according to a first embodiment of the present invention.
Figure 2:
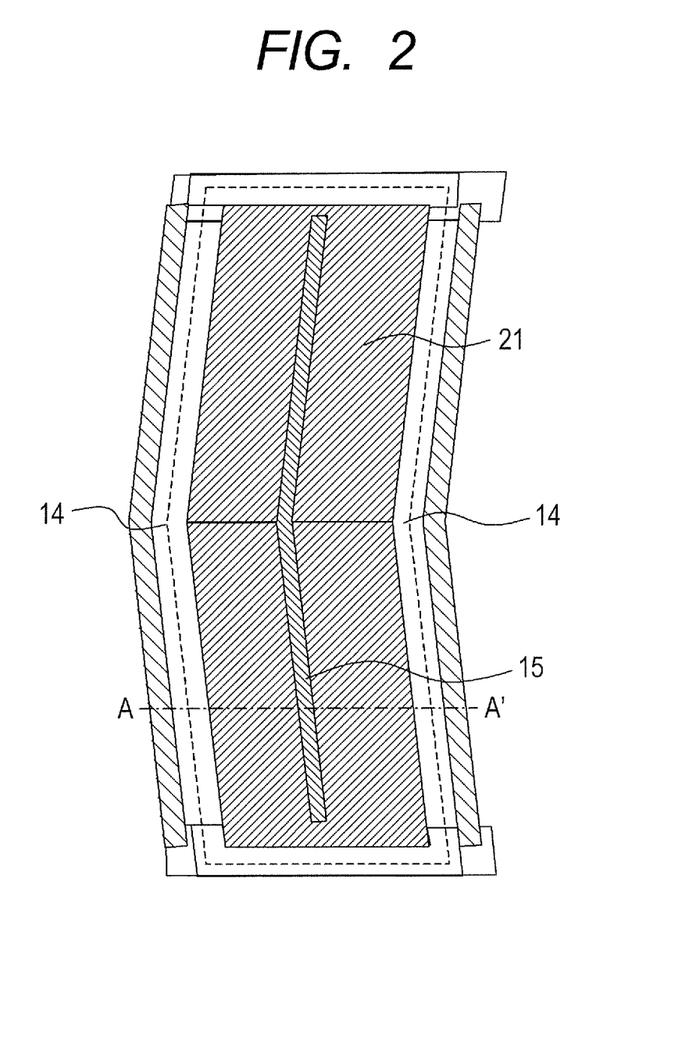
FIG. 2 is a diagram for showing a planar structure of a pixel of the liquid crystal display device according to the first embodiment of the present invention.

A cross-sectional structure of one pixel according to a first embodiment of the present invention is shown in FIG. 1, and a planar structure of one pixel is shown in FIG. 2. For example, FIG. 1 shows a cross-sectional structure of the plane A-A' of FIG. 2. On the substrate, insulating wall-shaped structures 14 are provided at the boundaries of the pixels, and a small wall-shaped structure 15 smaller than the wall-shaped structures 14 is provided between the wall-shaped structures 14 at the boundaries of the pixels. Each of the wall-shaped structures is formed using, for example, an organic film. At each of the wall-shaped structures 14 that are disposed at both ends of each pixel, formed are wall-shaped electrodes 211 covering the side faces thereof and planar electrodes 212 each extending in the planar direction from the face of the wall-shaped electrode in contact with the substrate. The wall-shaped electrodes 211 and the planar electrodes 212 are electrically connected to each other, and thus the wall-shaped electrodes and the planar electrodes are collectively referred to as wall electrodes 21. An insulating film 22 and an alignment film 23 are disposed between the planar electrode 212 and a liquid crystal layer 24. A TFT-side electrode (hereinafter, referred to as a TFT-side electrode 16) is formed at the small wall-shaped structure 15 to cover the same, and a common electrode (hereinafter, referred to as a storage capacitor electrode 17) is formed in the planar direction from the face of the small wall-shaped structure in contact with the substrate. An interlayer insulating film 20 is provided each between the storage capacitor electrode 17 and the planar electrode 212, and each planar electrode 212 is formed on the upper layer of the storage capacitor electrode 17 through the interlayer insulating film 20, so that the overlapped area serves as a storage capacitor.

The wall-shaped structures 14, the small wall-shaped structures 15, the TFT-side electrodes 16, the storage capacitor electrodes 17, the interlayer insulating films 20, the wall electrodes 21, the insulating films 22, and the alignment films 23 are formed on the substrate, so that a TFT-side substrate is configured.

On the other hand, black matrixes (BM) 28, color filters (CF) 27, CF-side electrodes 26, and over coats (OC) 25 are formed on the substrate, so that a CF-side substrate is configured.

In addition, the TFT-side substrate and the CF-side substrate are attached to each other, and the liquid crystal layer 24 is sealed between the both substrates.

In the embodiment, each of the TFT-side electrodes 16 provided on the TFT-side substrate and each of the CF-side electrodes 26 provided on the color filter-side substrate are disposed between the wall electrodes 21 at the boundaries of the pixels (hereinafter, the TFT-side electrodes 16 and the CF-side electrodes 26 are collectively referred to as pseudo wall electrodes). In the embodiment, the wall electrodes at both ends of the pixels serve as source electrodes, and the pseudo wall electrodes serve as common electrodes. However, the wall electrodes at both ends of the pixels may serve as common electrodes, and the pseudo wall electrodes may serve as source electrodes.

In the above-described configuration of the liquid crystal display device, each of the interlayer insulating films 20 is preferably formed using an SiN or $SiO_2$ inorganic film. Because using the inorganic film, the thickness of each interlayer insulating film 20 between the storage capacitor electrode 17 and the planar electrode 212 can be made smaller, and thus a storage capacitor can be easily formed.

However, if the interlayer insulating films 20 are formed even on the upper layers of the wall-shaped structures 14 at the boundaries of the pixels and the wall-shaped structures 14 at the boundaries of the pixels function as spacers, the interlayer insulating films 20 are cracked due to a pressure at the time of forming gaps when the substrates are attached to each other. Due to the crack of the interlayer insulating films 20, foreign substances are mixed into the liquid crystal layer 24 and the yield ratio is reduced by generation of bright spots and gap variations, resulting in an increase in cost.

In addition, if the interlayer insulating films 20 are formed on the upper layers of the wall-shaped structures 14 by deposition such as sputtering, the interlayer insulating films 20 are likely to be deposited at upper parts of the side faces of the wall-shaped structures. Thus, the thicknesses of the films at the upper parts of the wall-shaped structures become large. On the other hand, the insulating films are hardly deposited at the base portions of the wall-shaped structures, and thus the thicknesses of the films become small. This also applies to the case of the wall electrodes 21 formed on the upper layers of the interlayer insulating films. If the wall electrodes 21 are formed on the upper layers of the interlayer insulating films 20 whose thicknesses are uneven, the wall electrodes 21 are much less likely to be deposited at the base portions of the wall-shaped structures. Thus, disconnection is likely to occur between the wall-shaped electrodes 211 and the planar electrodes 212. As described above, if the interlayer insulating films 20 are formed on the upper layers of the wall-shaped structures 14, the yield ratio is reduced due to disconnection of the electrodes, leading to an increase in cost.

To address these problems, the present invention employs a structure in which the interlayer insulating films 20 are removed on the upper and side faces and at the base portions of the wall-shaped structures 14 at the boundaries of the pixels as shown in FIG. 1. In addition, the thicknesses of the wall electrodes 21 at connection parts between the wall-shaped electrodes 211 and the planar electrodes 212 are formed to be large at the base portions of the wall-shaped structures 14 at the boundaries of the pixels as shown in FIG. 1 in the present invention. Further, the wall-shaped structures 14 at the boundaries of the pixels formed using organic films are in contact with the color filter-side substrate through the alignment films 23 in the present invention.

With this structure, even if the wall-shaped structures 14 at the boundaries of the pixels are used as spacers SOC in combination, a pressure at the time of forming gaps is not applied to the interlayer insulating films 20. Thus, crack of the interlayer insulating films 20 can be suppressed. Specifically, mixture of foreign substances into the liquid crystal layer 24 and gap variations can be prevented. Further, when the wall electrodes 21 are formed, no interlayer insulating films 20 exist on the side faces of the wall-shaped structures 14. Accordingly, the electrode layers at the base portions of the wall-shaped structures 14 can be easily formed, and the thicknesses of the films can be made large. Thus, disconnection between the wall-shaped electrodes 211 and the planar electrodes 212 can be prevented. As described above, with the structure of FIG. 1, the wall-shaped structures 14 can be used as the spacers SOC in combination, and the number of layers can be reduced. In addition, mixture of foreign substances into the liquid crystal layer and gap variations can be prevented, and a reduction in the yield ratio due to disconnection of the wall electrodes can be suppressed, leading to a decrease in cost.

Figure 3:
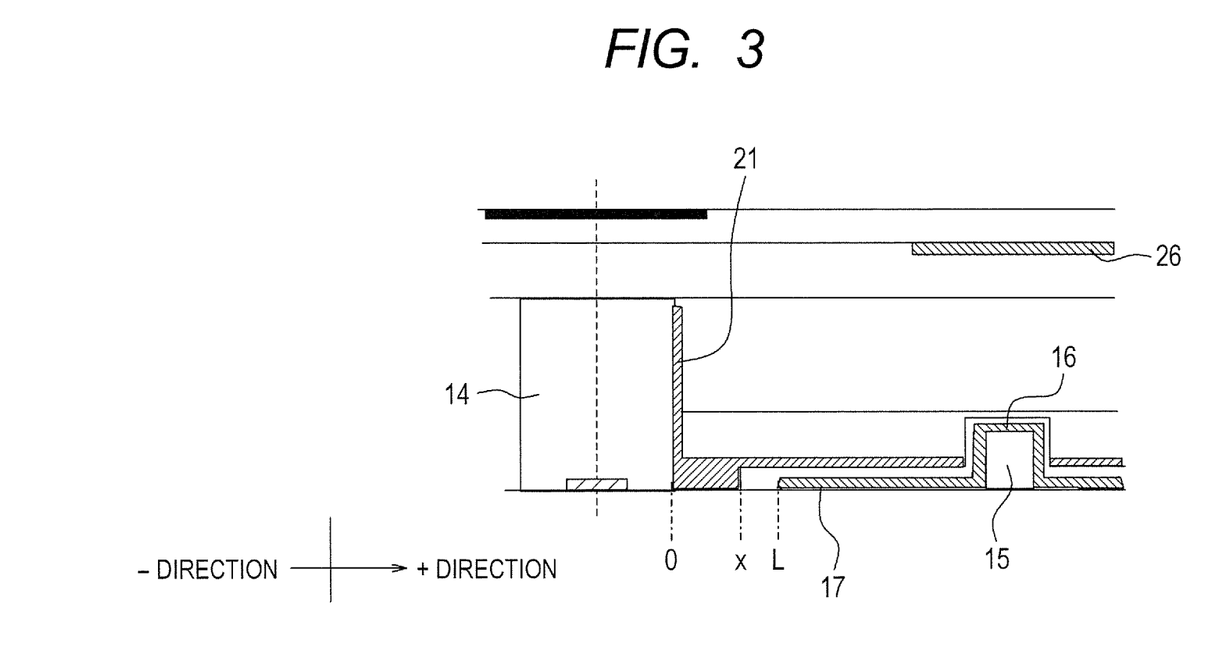
FIG. 3 is a diagram for explaining a position suitable for patterning an interlayer insulating film according to the first embodiment of the present invention.

On the other hand, misalignment of layers occurs in the manufacturing process, and thus it is necessary to consider an impact caused by the misalignment of layers in the pixel structure. The misalignment of layers means a phenomenon in which when layers are laminated on each other from a reference layer, misalignment occurs between the reference layer and the laminated layers. For example, if it is assumed that an impact by the misalignment of layers causes a difference of ±0.5 μm between the layers, it is necessary to separate an end of each interlayer insulating film 20 from an end of the storage capacitor electrode 17 and a side face of the wall-shaped structure 14 by at least 1 μm or larger. This is because if being separated from an end of each interlayer insulating film 20 only by 1 μm or smaller and an end of the interlayer insulating film 20 and an end of the storage capacitor electrode 17 are shifted by +0.5 μm and −0.5 μm, respectively, there is a possibility of short-circuit of the storage capacitor electrodes 17 and the wall electrodes 21 because the storage capacitor electrodes 17 cannot be completely covered with the interlayer insulating films 20. In addition, if an end of each interlayer insulating film 20 and a side face of each wall-shaped structure 14 are shifted by +0.5 μm and −0.5 μm, respectively, the interlayer insulating films 20 are formed on the side faces of the wall-shaped structures 14, and thus there is a possibility that the interlayer insulating films 20 are cracked due to a pressure at the time of forming gaps. Thus, as shown in FIG. 3, if it is assumed that the positions of the wall-shaped structure 14 and the storage capacitor electrode 17 are 0 and L(μm), respectively, a position x(μm) suitable for patterning the interlayer insulating film 20 satisfies $1 \le x \le L-1(\mu m)$. If the interlayer insulating film 20 is patterned within the area and an impact caused by the misalignment of layers in the manufacturing process occurs, short-circuit of the storage capacitor electrodes 17 and the planar electrodes 212 can be suppressed, and the interlayer insulating films 20 can be prevented from being formed on the side faces of the wall-shaped structures 14. In addition, a storage capacitor can be stably formed and gaps can be stably formed.

In the structure of the first embodiment of the present invention as described above, if the wall-shaped structures are used as the beds of the wall electrodes and the spacers SOC in combination, mixture of foreign substances into the liquid crystal layer, gap variations, and disconnection of the electrodes can be prevented. Thus, the number of layers can be reduced and the yield ratio can be improved, realizing a decrease in cost.

Second Embodiment

Figure 4:
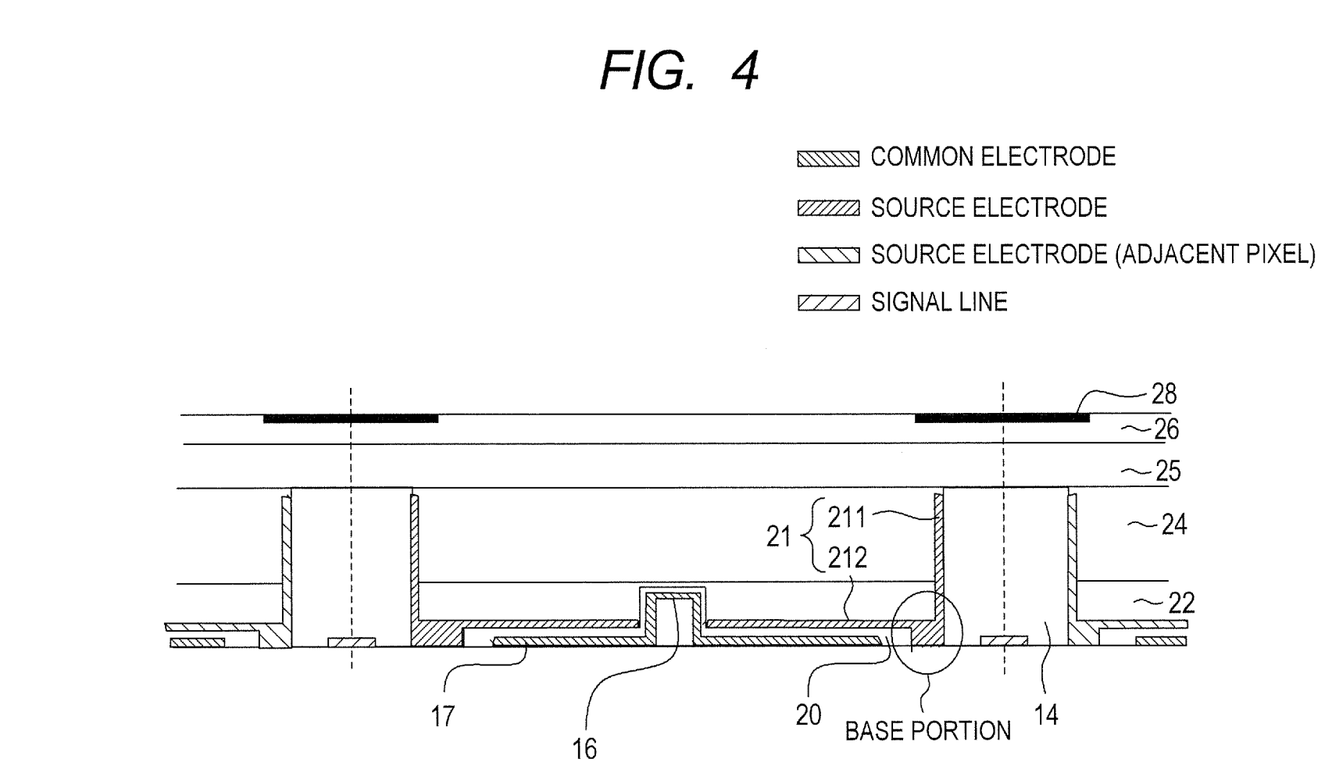
FIG. 4 is a diagram for showing a cross-sectional structure of a pixel of a liquid crystal display device according to a second embodiment of the present invention.

A cross-sectional structure of one pixel of a liquid crystal display device according to a second embodiment of the present invention is shown in FIG. 4. Although the CF-side electrodes 26 are disposed on the CF-side substrate to form the pseudo wall electrodes in the first embodiment, the same function effect can be obtained even in the cross-sectional structure where no CF-side electrodes 26 exist, as shown in FIG. 4. Thus, if the wall-shaped structures are used as the beds of the wall electrodes and the spacers SOC in combination even in the structure of the second embodiment of the present invention, mixture of foreign substances into the liquid crystal layer, gap variations, and disconnection of the electrodes can be prevented. Thus, the number of layers can be reduced and the yield ratio can be improved, realizing a decrease in cost.

Figure 5:
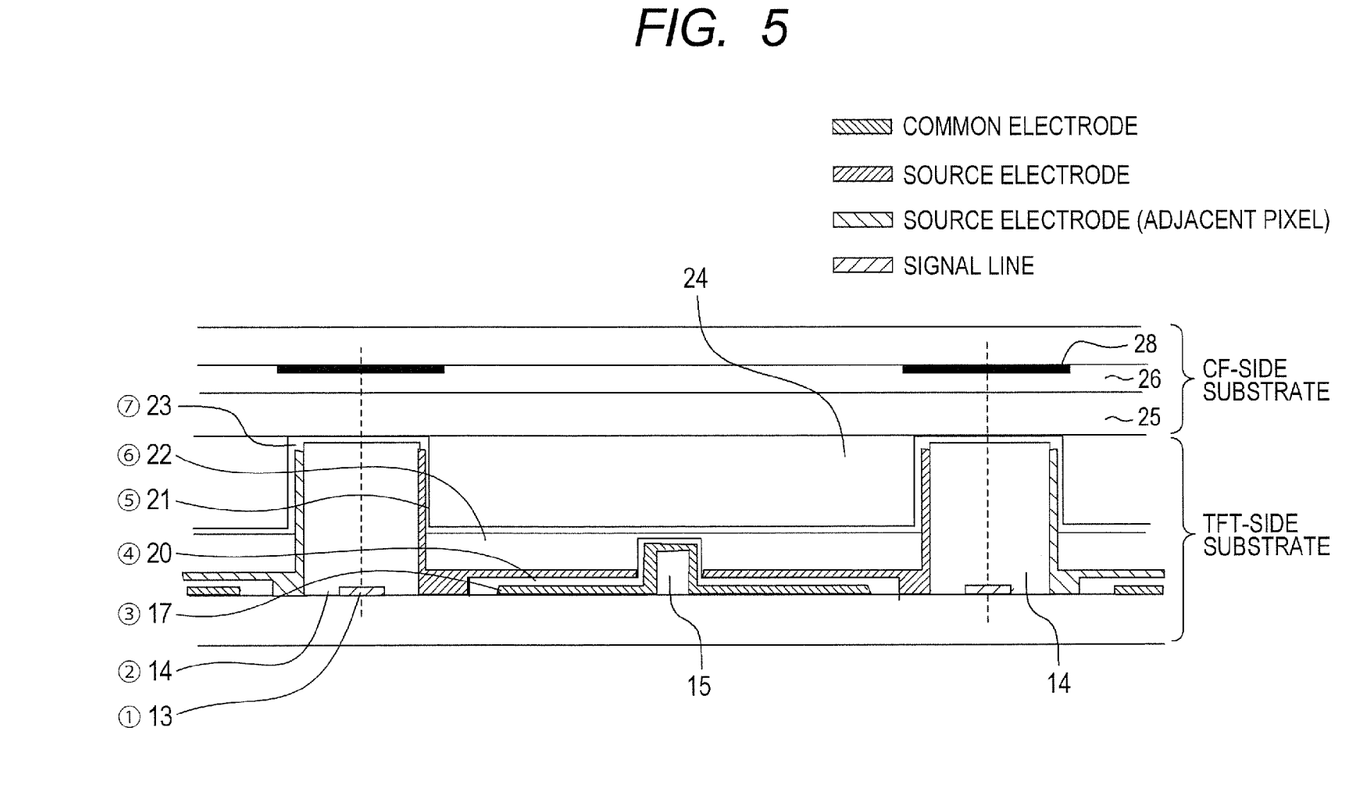
FIG. 5 is a diagram for explaining a manufacturing method of the liquid crystal display device of the present invention.

The order of layers in the structure of the TFT-side substrate of the present invention is shown in FIG. 5 using circled numbers. In addition, a process flow of manufacturing the liquid crystal display device will be described below on the basis of the order.

(1) The signal lines 13 are formed on the entire TFT-side substrate by sputtering or CVD, and are patterned by a technique such as photolithography to realize a desired pattern. The material of the signal lines is metal (Al, Cu, Mo, W or the like).

(2) Insulating films serving as the wall-shaped structures are formed on the entire upper layers thereof by spin coating, and are patterned by photolithography or the like. In this case, the large wall-shaped structures 14 and the small wall-shaped structure 15 between the large wall-shaped structures may be patterned by a technique such as half exposure or may be separately formed.

(3) ITO electrodes serving as the common electrodes 17 are formed on the entire upper layers of the wall-shaped structures, and ITO is patterned so as to cover the small wall-shaped structure 15.

(4) Inorganic insulating films made of SiN or $SiO_2$ serving as the interlayer insulating films 20 are formed on the entire upper layers of the common electrodes 17 by a CVD method or the like, and SiN or $SiO_2$ is removed by patterning around the large wall-shaped structures 14.

(5) ITO serving as the wall electrodes 21 is formed on the entire upper layers of the interlayer insulating films 20 by sputtering or the like, and is patterned to realize a desired pattern.

(6) In the above-described process, holes exist between the large wall-shaped structures 14 and the small wall-shaped structure 15. In order to fill the holes, an organic insulating film material serving as the insulating films 22 is entirely formed by spin coating. The organic insulating films may be removed at the tops of the large wall-shaped structures 14, or may be formed at the tops of the large wall-shaped structures 14. FIG. 5 shows a case in which the organic insulating films are removed at the tops of the large wall-shaped structures 14.

(7) Following the formation of the insulating films 22, the alignment films 23 are entirely formed. In addition, an alignment restraining force is applied to the alignment films by a rubbing or photo-alignment technique, so that the liquid crystal can be aligned in a constant direction.

(8) The TFT-side substrate formed by the above-described process and the CF-side substrate are attached to each other, and the liquid crystal layer is sealed. Accordingly, the liquid crystal display device can be completed.

In the above-described process, after the inorganic insulating films serving as the interlayer insulating films 20 are entirely formed, the inorganic insulating films around the large wall-shaped structures 14 are removed. Then, the wall electrodes 21 are formed on the entire upper layers thereof by sputtering, so that the thicknesses of the wall electrodes 21 at connection parts between the wall-shaped electrodes 211 and the planar electrodes 212 can be formed to be large at the base portions of the large wall-shaped structures 14.

What is claimed is:

1. A liquid crystal display device comprising:
a plurality of pixels disposed in a matrix shape, each pixel having insulating wall-shaped structures at the boundaries of the pixels and a smaller wall-shaped structure between the wall-shaped structures;
wall electrodes, each having wall-shaped electrodes formed on the side faces of the wall-shaped structures at the boundaries of the pixels, and planar electrodes that are connected to the wall-shaped electrodes and extend in the planar direction from faces where the wall-shaped electrodes are in contact with a substrate;
electrodes, each having a TFT-side electrode covering the small wall-shaped structure and a storage capacitor electrode that is connected to the TFT-side electrode and extends in the planar direction of the substrate; and
an interlayer insulating film formed between the storage capacitor electrodes and the planar electrodes, wherein
the interlayer insulating film does not exist at each of a plurality of connection parts between the wall-shaped electrodes and the planar electrodes,
the thicknesses of the wall electrodes at the plurality of connection parts between the wall-shaped electrodes and the planar electrodes are formed to be larger than the wall-shaped electrodes, and
the planar electrodes have portions where the thicknesses are less than the thicknesses of the wall-shaped electrodes at the plurality of connection parts between the wall-shaped electrodes and the planar electrodes.

2. The liquid crystal display device according to claim 1, wherein
the interlayer insulating film of inorganic films are not formed on the upper and side faces and at the base portions of the wall-shaped structures at the boundaries of the pixels.

3. The liquid crystal display device according to claim 1, wherein
each of the wall-shaped structures having a base, and
a distance between the base and an edge of the storage capacitor electrode is larger than a distance between the base and an edge of the interlayer insulating film.

4. The liquid crystal display device according to claim 1, wherein
the wall-shaped structures at the boundaries of the pixels are used as spacers for a color filter-side substrate.

5. The liquid crystal display device according to claim 1, wherein
color filter-side electrodes are provided on the color filter-side substrate, and the TFT-side electrodes and the color filter-side electrodes are used as pseudo wall electrodes.

6. The liquid crystal display device according to claim 1, wherein the interlayer insulating film is an inorganic film.

7. A liquid crystal display device comprising:
a plurality of pixels disposed in a matrix shape, each pixel having insulating wall-shaped structures at the boundaries of the pixels and a smaller wall-shaped structure between the wall-shaped structures;
wall electrodes, each having wall-shaped electrodes formed on the side faces of the wall-shaped structures at the boundaries of the pixels, and planar electrodes that are connected to the wall-shaped electrodes and extend in the planar direction from faces where the wall-shaped electrodes are in contact with a substrate;

electrodes, each having a TFT-side electrode covering the small wall-shaped structure and a storage capacitor electrode that is connected to the TFT-side electrode and extends in the planar direction of the substrate; and an interlayer insulating film formed between the storage capacitor electrodes and the planar electrodes, wherein the interlayer insulating film does not exist at each of a plurality of connection parts between the wall-shaped electrodes and the planar electrodes, the thicknesses of the wall electrodes at the plurality of connection parts between the wall-shaped electrodes and the planar electrodes are formed to be larger than the wall-shaped electrodes, the planar electrodes have portions where the thicknesses are less than the thicknesses of the wall-shaped electrodes at the connection parts between the wall-shaped electrodes and the planar electrodes, and the wall-shaped structures at the boundaries of the pixels formed using organic films are in contact with a color filter-side substrate through alignment films.

8. The liquid crystal display device according to claim 7, wherein the wall-shaped electrodes are formed up to near the color filter-side substrate.

9. The liquid crystal display device according to claim 7, wherein the interlayer insulating film is not formed on the upper and side faces of the wall-shaped structures at the boundaries of the pixels.

10. The liquid crystal display device according to claim 7, wherein the wall-shaped structures at the boundaries of the pixels are used as spacers for the color filter-side substrate.

11. The liquid crystal display device according to claim 7, wherein color filter-side electrodes are provided on the color filter-side substrate, and the TFT-side electrodes and the color filter-side electrodes are used as pseudo wall electrodes.

12. The liquid crystal display device according to claim 7, wherein the interlayer insulating film is an inorganic film.

* * * * *